United States Patent [19]
Dunton et al.

[11] Patent Number: 6,151,069
[45] Date of Patent: *Nov. 21, 2000

[54] DUAL MODE DIGITAL CAMERA FOR VIDEO AND STILL OPERATION

[75] Inventors: Randy R. Dunton, Phoenix; Werner Metz; Curt Corum, both of Chandler; Lawrence A. Booth, Jr., Phoenix; Tinku Acharya, Tempe; Thomas C. Jones, Phoenix, all of Ariz.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/963,097

[22] Filed: Nov. 3, 1997

[51] Int. Cl.⁷ .................................................. H04N 5/225
[52] U.S. Cl. ......................... 348/220; 348/552; 348/390
[58] Field of Search ................................... 348/220, 221, 348/222, 384, 390, 399, 420, 426, 552; H04N 5/225

[56] References Cited

U.S. PATENT DOCUMENTS

| | | |
|---|---|---|
| 4,949,180 | 8/1990 | Miles . |
| 5,136,371 | 8/1992 | Savatier et al. .................. 348/384 |
| 5,402,170 | 3/1995 | Parulski et al. . |
| 5,506,617 | 4/1996 | Parulski et al. . |
| 5,525,957 | 6/1996 | Tanaka ..................................... 348/220 |
| 5,559,552 | 9/1996 | Inuiya et al. ........................... 348/220 |
| 5,576,757 | 11/1996 | Roberts et al. . |
| 5,734,424 | 3/1998 | Sasaki . |

OTHER PUBLICATIONS

"Canon's Optura: A digital Camcorder That Performs Like an SLR Camera," HyperZine Manufacturer's View, original posting: Aug. 25, 1997; revised: Sep. 03, 1997, pp. 1–3.

"Forming Consumer Electronics Online News: Aug. 25, 1997," HyperZine Expert's View, original posting: Aug. 25, 1997, pp. 1–3.

*Primary Examiner*—Tuan Ho
*Attorney, Agent, or Firm*—Blakely, Sokoloff, Taylor & Zafman LLP

[57] ABSTRACT

A cost effective digital image capture apparatus such as a digital camera that operates in both still mode and video mode, using a common programmable image processing chain and fixed optics. The full resolution of the image sensor (yielding raw image data) may be used in still mode, with adequate signal-to-noise ratio (SNR) achieved either from the scene ambient lighting or from supplemental light supplied by a strobe. In video mode, the apparatus may be configured to capture video image data by programming the parameters for image processing methodologies such as scaling, decorrelation, and encoding into a look-up table (LUT) which in turn configures logic circuitry to spatially scale and compress if necessary the raw image data in order to meet storage and transmission bandwidth constraints for video images. In video mode, adequate SNR may be achieved despite the lower light conditions, encountered, for example, during videoconferencing, by averaging pixels together during scaling.

13 Claims, 3 Drawing Sheets

DUAL MODE DIGITAL CAMERA FOR VIDEO AND STILL OPERATION

BACKGROUND INFORMATION

This invention is generally related to electronic imaging and more particularly to digital cameras.

The digital camera has recently been developed as a portable system that acquires and stores digital still images in electronic form. The images may be used in a number of different ways, such as being displayed in an "electronic" photo album or used to embellish graphical computer applications. The digital camera has a user interface much like a conventional chemical film camera, but the images are captured and stored entirely using electronic solid state circuitry and image processing techniques.

A typical digital camera has an electronic image sensor that receives incident light reflected from an object or scene through an optical interface. The optical interface may include a lens system, an aperture mechanism, and perhaps a light filter. The sensor can typically be implemented as an array of charge coupled device (CCD) or complimentary metal oxide semiconductor (CMOS) photodetecting circuits that create light-generated signals in response to the incident light. Analog signals from the sensor are converted into digital format by an analog-to-digital (A/D) converter and are then further processed by logic circuitry and/or a programmed processor to yield a captured digital image of the object or scene. The image may then be stored in local memory aboard the camera. In addition, the image may be transferred to a computer that is linked to the digital camera, for storage as an electronic file and/or for further graphical and image processing to improve the image quality or use with graphics software.

Most purchasers of digital cameras have access to a desktop computer for viewing the still images. Therefore, such purchasers might also enjoy using their digital camera to communicate with another person, such as in videoconferencing with a desktop computer in order to both see and hear the other person. However, most digital cameras are typically configured to provide only still images. Similarly, cameras used for videoconferencing do not operate as a still camera when disconnected from the computer. Therefore, there is a need for a digital camera and associated image processing architecture that permits "dual mode" use of the camera for both video, where the camera may be linked to a desktop computer for video purposes, and still image capture.

SUMMARY

The invention is directed at a method of configuring a signal processing system to operate in one of at least two modes to yield video and still image data, a first mode for processing image sensor signals according to a first selection of signal processing methodologies, to obtain still image data, and a second mode for processing the same image sensor signals according to a second selection of signal processing methodologies, to obtain video image data.

In a particular embodiment of the invention, the signal processing methodologies include image scaling, decorrelation, and entropy encoding that are performed sequentially to yield video or still data from the same original image data. The first selection of scaling, decorrelation, and encoding is designed to provide video data, whereas the second selection is designed to provide data for still images which would normally have greater size and detail than the video images. In a preferred embodiment, the system yields video or still data depending on the parameters loaded into look-up-tables (LUTs) that are used to configure logic circuitry for performing the image decorrelation and entropy encoding.

BRIEF DESCRIPTION OF THE DRAWINGS

These and other features as well as advantages of the different embodiments of the invention will be apparent by referring to the drawings, detailed description and claims below, where:

DETAILED DESCRIPTION

As briefly summarized above, the invention is directed at a method of signal processing in a system and apparatus that operates in at least two modes to provide still and video images through the same signal processing system, thereby reducing the cost to the consumer of purchasing separate still image and video cameras. In one embodiment, the signal processing system provides video and still data from the same detailed, original image sensor signals by performing digital image processing operations in a chain fashion. The original image sensor signals are digitized and prepared to be spatially scaled, and then decorrelated and encoded into compressed data. The different image processing operations are implemented in reprogrammable logic circuitry accessible through a computer bus, or alternatively by programming a high performance data processor to execute the operations in software.

For purposes of explanation, specific embodiments are set forth below to provide a thorough understanding of the invention. However, as understood by one skilled in the art, from reading this disclosure, the invention may be practiced without such details. Furthermore, well-known elements, devices, process steps, and the like, are not set forth in detail in order to avoid obscuring the invention.

Figure 1:
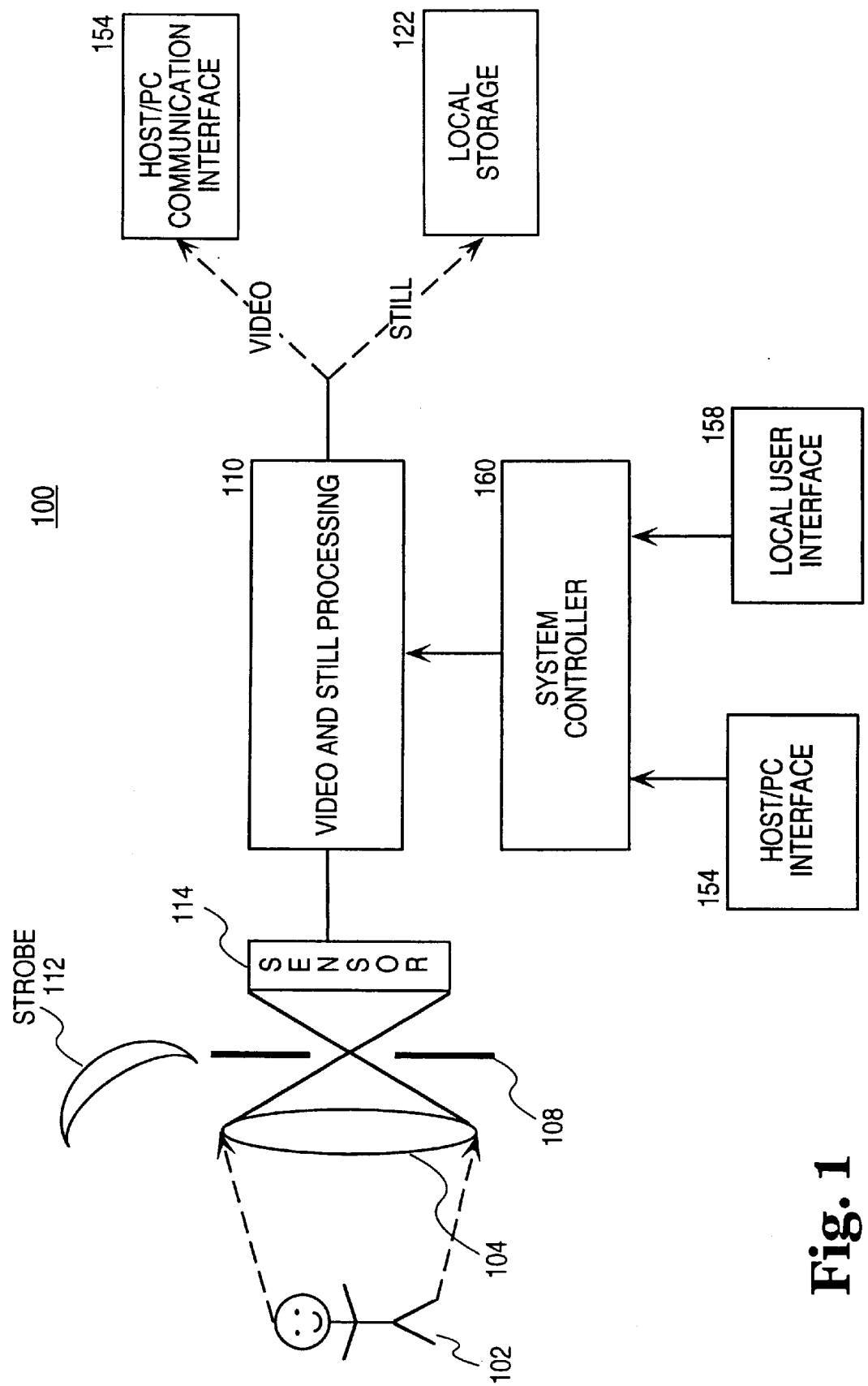
FIG. 1 is a logical block diagram of a digital image capture apparatus according to an embodiment of the invention.

FIG. 1 is a logical block diagram of a digital image capture apparatus 100 such as a digital camera having a video and still processing block 110 according to an embodiment of the invention. The apparatus 100 includes an optical interface having a lens system 104 and an aperture 108 for being exposed to incident light reflected from an object 102 whose image is to be captured. The apparatus 100 may also include a strobe or electronic flash for generating supplemental light to further illuminate the object 102 when the apparatus 100 is operating under low light conditions.

The lens system 104 preferably has a fixed focal length which may be acceptable for both video and still operation, because a drop in the modulation transfer function (MTF) of the optical interface (and thus a degradation in image quality) for objects at close ranges (such as a user's face during videoconferencing) may be tolerated in video mode. The optical interface has an aperture mechanism 108 to control the dose of light on the sensor and the depth of focus, and may be configured for both video and still operation with only two settings as described below.

The optical interface channels the incident light onto an electronic image sensor 114. The image sensor 114 has a number of pixels which are electrically responsive to incident light intensity and color. The sensor 114 generates signals that will represent a captured image having sufficient resolution to be acceptable as a still image. An A/D converter (not shown) that receives light-generated analog sensor signals may be included in the sensor 114 and used to generate digital sensor signals that define a digital image of the exposed object 102 and the accompanying scene. Alternatively, the sensor 114 provides analog signals to the block 110 which in turn may perform analog signal processing on the signals before converting them to digital format. In either scenario, the digitized sensor signals thus define original image data which are then processed according to image processing methodologies by the video and still block 110 in order to form still images, or a sequence of video images depicting motion by the exposed object or scene, depending on whether the still or video mode of operation has been selected.

Mode selection can be made by the user of the apparatus 100 via mechanical controls (not shown) on the apparatus 100. Mechanical knob settings can be received and translated by a local user interface 158 into control signals and data to be processed by a system controller 160. Alternatively, the apparatus 100 can be tethered to a host computer, such as a Personal Computer (PC), via a host/PC communication interface 154. The user can then make the mode selection through software running on the host which in turn communicates the proper control signals and data to the system controller 160 via the host/PC interface 154.

The system controller 160 orchestrates the capture of video and still images in response to the mode selection made by the user as outlined above. The system controller 160 configures the video and still processing block 110 to provide either still image data, or video image data depicting a sequence of video image frames. The images are then stored aboard the apparatus 100 and/or transferred to the host/PC for decompression (if the images had been compressed), rendering, and/or display.

The image capture apparatus 100 includes a local storage device 122 which receives and stores the still image data. The storage device 122 may include a FLASH semiconductor memory and/or a rotating media device. The FLASH memory may be removable, such as the Intel® Miniature Card. The rotating media may also be removable or fixed, and may be of the magnetic disk or other type suitable for storing image data files.

The image data may also be transferred outside the apparatus 100 via the host/PC communication interface 154. The communication interface 154 can be configured to transfer both still and video image data to the host/PC according to a computer peripheral bus standard. The bus standards used can be, for example, the RS-232 serial interface, the Universal Serial Bus (USB), or the higher performance Institute of Electrical and Electronics Engineers (IEEE) Standard 1394-1995.

As mentioned above, the apparatus 100 is configurable both optically and electronically to operate in a number of modes, including video mode such as during videoconferencing, and still mode such as when taking pictures similar to using a conventional portable camera. From an optical standpoint, a fixed focal length lens system 104, such as one having 10 mm effective focal length, is preferred and can be used for both modes in order to reduce the cost of manufacturing the apparatus embodiment. In the video mode, used in videoconferencing and rapid frame rate applications to capture motion, an aperture 108 of about f/2 may be selected. The prime focus for this aperture setting is preferably at a distance of about 1 meter for the object 102 with depth of field extending to 2 meters for the background.

In the still mode of operation, acceptable quality still images of both outdoor and indoor scenes can be captured. For indoor scenes, the light level may be so low as to require supplemental light generated by a strobe or electronic flash 112. One would normally select an aperture 108 of between f/2 and f/8 for indoor scenes. Within this aperture range, the prime focus is at a distance of about 2 meters for the subject with depth of field extending to 4 meters for the background. For outdoor scenes with ambient light, the prime focus is preferably at a distance of about 2–3 meters for the subject with depth of field extending to infinity. Normally, one would select an aperture of about f/8 for outdoor scenes to accomplish that focus.

The image capture apparatus 100 can also be electronically configured for dual mode operation by so configuring the video and still processing block 110 to provide either still image data or a sequence of video images. In one embodiment, the block 110 implements digital signal and image processing functions as logic circuitry and/or a programmed data processor to generate compressed image data having a predefined resolution and compression ratio from detailed, original image data received from the sensor 114. Such a block 110 is illustrated in FIG. 2 which is a logical block diagram of part of a digital camera (or other image capture apparatus) image processing system 200 according to another embodiment of the invention.

Figure 2:
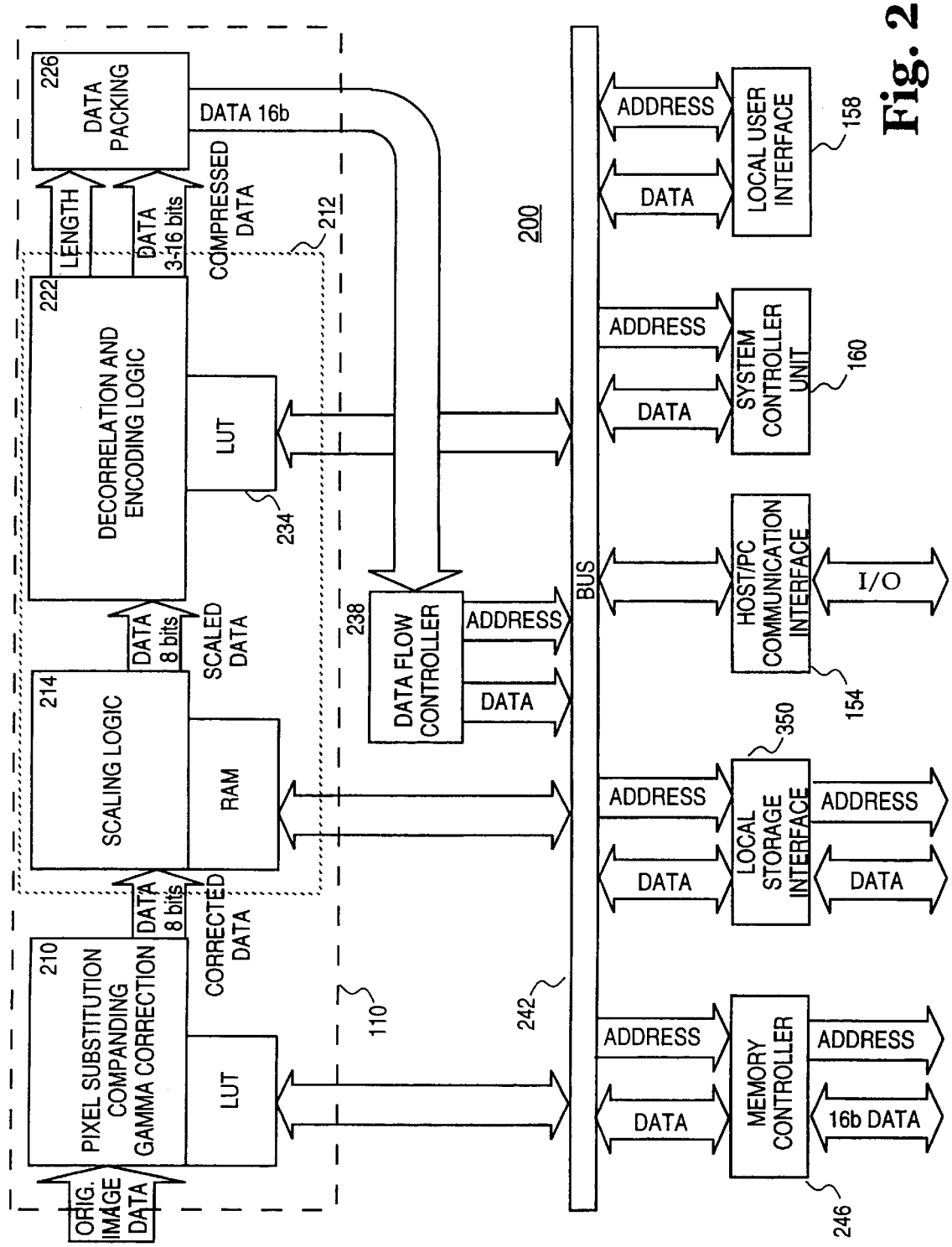
FIG. 2 illustrates an architecture for a signal and image processing system according to another embodiment of the invention.

FIG. 2 shows a data flow diagram for an embodiment of the invention of the path taken by image data for both video and still modes of operation. The processing block 110 includes a chain of imaging functions which may begin with a correction block 210. The correction block 210 is used whenever the quality of the original image data received from the sensor 114 warrants some sort of pre-processing before the image is scaled and compressed. In certain cases, the correction block 210 performs pixel substitution, companding, and gamma correction on the original image data received from the image sensor. The original image data should be of sufficient detail (e.g., 768×576 spatial resolution or higher is preferred) to yield still images of acceptable quality.

Pixel substitution may be performed in block 210 to replace invalid pixel data with valid data to provide a more deterministic input to subsequent imaging functions. Companding may be performed to lower the resolution of each pixel (the number of bits per pixel). For example, the original image data can arrive as 10 bits per pixel, whereas a preferred pixel resolution for the logic circuitry may be 8 bits (1 byte). Conventional gamma correction may also be performed to conform the information content of the image to that expected by the host computer where the image will be ultimately displayed.

Other functions that may be performed in block 210 on each received original image frame include fixed pattern noise reduction which is often needed before compressing an image. Once again, whether or not any correction functions are performed by block 210 in general depends on the quality of the original image data received from the sensor 114 and any subsequent image processing such as scaling or compression to be performed before the image data is ready for storage or transmission to the host computer.

Once the original image data has been corrected or otherwise processed into the desired size or format by correction block 210, the corrected data may be scaled and compressed if needed to meet the transmission and storage requirements of the host/PC communication interface 154 and the local storage device 122 as seen in FIG. 1. To meet such requirements, the processing block 110 can include scaling and compression logic 212 to perform any necessary image scaling and compression prior to transmission and/or storage.

For instance, the scaling and compression logic 212 may be configured to reduce image size and resolution to yield smaller, less detailed video images, as compared to larger and more detailed still images. Smaller and less detailed image data may be required in order to transmit a rapid sequence of video images that are to be decompressed and viewed in the host/PC. However, if the transmission link between the apparatus 100 and the host/PC has sufficient bandwidth to transmit a sequence of detailed original image data at the needed rate to the host/PC, then the scaling and compression logic 212 can be simplified or even eliminated for both still or video operation.

A number of digital image processing functions are contemplated for the compression logic 212 as shown in FIG. 2. These or others similar in function may be configured as described below by one skilled in the art depending on the performance (speed of rendering the compressed image data) and image quality desired from the system 200 given the optical interface used in the apparatus 100. The imaging functions have been implemented in one embodiment as separate units of logic circuitry as shown in FIG. 2 and which are described as follows.

The scaling logic 214 performs a 2-D spatial scaling of the corrected image data in order to yield smaller images that may be easier to store or transmit. The scaling is done according to a selected scaling ratio using conventional known techniques. The scaling ratio may be integer or fractional. The scaling can be performed in a 2-dimensional fashion by, for instance, utilizing two separate 1-dimensional scaling processes.

The scaling logic 214 can be used for both video and still image capture simply by selecting the appropriate scaling ratio. For instance, a 4:1 sub-sampling of the corrected image may be performed in video mode so that 16 pixels from the corrected image data are averaged together to produce 1 pixel in the scaled image data. Based on standard sampling theory, and assuming uncorrelated noise sources, the sub-sampling may also improve the signal to noise ratio by $\sqrt{16}$, or a factor of 4. Lower scaling ratios such as 2:1 may also be used, where 4 pixels are averaged to generate a single pixel in the scaled image data, resulting in a signal to noise ratio (SNR) improvement of 2. By scaling the more detailed corrected image data in this way during operation in video mode, the system 200 compensates for the increased noise due to lower light levels that are typically encountered with video operation, such as during videoconferencing.

Next in the chain of imaging function blocks in FIG. 2 is the decorrelation and encoding logic 222. The scaled image data received from the scaling logic 214 is decorrelated in preparation for entropy encoding which is a type of image compression, according to a selected one of a number of decorrelation methodologies. Once again, the user may select a particular decorrelation methodology that is suitable for obtaining the normally smaller size video images.

The decorrelation function can generate error image data as differences between neighboring pixels. One particular method that can be used for image decorrelation is digital pulse code modulation (DPCM). To obtain more compression of the image data, if needed, for example, in transmitting a large number of video image frames, "loss" may be introduced in the form of "quantization" (mapping a first set of data to a smaller set of values) errors using DPCM.

The next stage in the chain of imaging function blocks is entropy encoding performed by block 222, which uses a variable length encoding technique to compress the decorrelated image data. For instance, a commonly known entropy encoding methodology that may be used is Huffman encoding. Entropy encoding involves replacing symbols in the decorrelated image data by bit strings in such a way that different symbols are represented by binary strings of different variable lengths, with the most commonly occurring symbols being represented by the shortest binary strings. The entropy encoding logic 222 thus provides compressed image data, for instance as seen in FIG. 2, where the scaled 8-bit data is encoded into data having variable size of 3–16 bits.

Once again, the encoding methodologies for obtaining video and still images can be different and may be selected depending on the mode of operation. For instance, a larger set of symbols (having variable binary string lengths) may be used for encoding still image data as compared to video image data. This is because there may be more time allocated in the host/PC to decompress still images than to decompress video images. In contrast, for encoding video images, a more limited set of symbols having uniform binary string lengths should be employed to obtain faster decompression of a series of video image frames. In addition, having a uniform binary string length allows usage of a fixed amount of bandwidth to transmit the image data that is specifically suitable for a host/PC interface such as the USB.

The image processing system 200 includes additional logic that facilitates the dual mode operation described above. In particular, the logic circuitry in blocks 210 and 212 use programmable look-up tables (LUTs) and random access memories (RAMs) for flexibility in performing their respective imaging functions. Each LUT or RAM provides information to its respective imaging function logic as specified by the selected methodology for the particular mode of operation. For instance, the scaling logic 214 uses a RAM storage area to store intermediate scaling computations. Also, the LUT 234 for the decorrelation and encoding logic can be loaded with different rules and data required for performing decorrelation and encoding as known in the art, depending on whether a still or a video image is desired. In a particular embodiment, two look-up tables (LUTs) are used for LUT 234, one for listing the characters (a so-called "code book") and one for listing the string lengths.

Different techniques may be used to determine the proper values to be loaded into the RAM and LUTs. For instance, image metering may be performed by the camera controller unit 160 to determine lighting and other factors which impact decorrelation and entropy encoding. Also, as mentioned earlier, transmission and storage constraints may dictate greater compression, especially during video operation where a large number of image frames are generated, so that the LUTs for decorrelation and entropy encoding will include a smaller code book for compression of the image data.

Although the different LUTs and RAM described above may be implemented as part of a single, physical RAM unit or alternatively may be combined in different combinations as one or more RAM units, each LUT and RAM is preferably implemented in a physically separate unit to obtain faster performance of the imaging functions.

After the image data has been compressed according to the desired mode by the compression logic 212, the now variable size data is then passed to the data packing unit 226 where the data is packed into constant size, and therefore more manageable, data segments for more efficient storage and transmission over a computer bus. Once again, if the image data from the sensor 114 is sufficiently acceptable as is, and there are no further transmission or storage constraints on such data, then the data packing unit becomes superfluous, since the sensor image data has a constant size and can be easily stored or transferred outside the apparatus 100 with minimal processing.

In the data packing unit 226, received data blocks of different size are packed into blocks having a predefined, constant size. For example, the system 200 in FIG. 2, the data packing unit packs the variable size compressed image data into 16-bit blocks. The 16-bit blocks are then forwarded to a data flow controller 238 such as a Direct Memory Access (DMA) controller, which then adds address information to each data block before accessing a bus 242 in order to forward the 16-bit blocks onto the bus. The memory controller 246 accepts the 16-bit blocks over the bus 242 and stores them temporarily in memory such as dynamic RAM (DRAM) (not shown) aboard the apparatus 100.

After being packed, the still image data may then be transferred over the bus 242 to the local storage 122 (see FIG. 1) via a local storage interface 250 coupled to the bus 242. For instance, the local storage device 122 may be a removable FLASH memory card which receives the image data prepared as a "file", including compression tables, file headers, time and date stamps, and metering information attached to the image data. The card may then be removed from the apparatus 100 and inserted into a PC to transfer the still image data for decompression, viewing and/or further processing in the PC.

As an alternative to using a removable storage device, the host/PC communication controller 154 may be used to transfer both the still and video images outside the apparatus 100. This may be accomplished by preparing the still image data as a disk file appropriate for transmission using the particular bus standard used in the communication interface 154, to be transferred to the host computer for storage and access by a host processor (not shown). The video image data can be streamed according to known techniques to the host computer via a controller interface such as USB.

The dual mode operation of the image capture apparatus 100 and processing system 200 has been described in the context of a bus-based architecture shown in FIG. 2. To further facilitate software control of the different modes of operation in this architecture, a number of memory-mapped control registers (not shown) may be coupled to the bus 242 to allow the system controller 160 to configure the apparatus 100 and the system 200 with the desired mode of operation. Instructions can be provided for execution by the system controller to access the LUTs, RAM, and control registers via the bus 242 in order to program the parameters needed for the proper image processing methodologies of the selected mode of operation. For instance, the different rules and parameters for scaling, decorrelation, and entropy encoding methodologies for all modes of operation may be stored as controller instructions aboard the apparatus 100 during manufacture, where each mode of operation is assigned a different set of methodologies. The appropriate set can be loaded into the video and still block 110 in response to a mode selection by the user, made through either the local user interface 158 or the host/PC communication interface 154.

Figure 3:
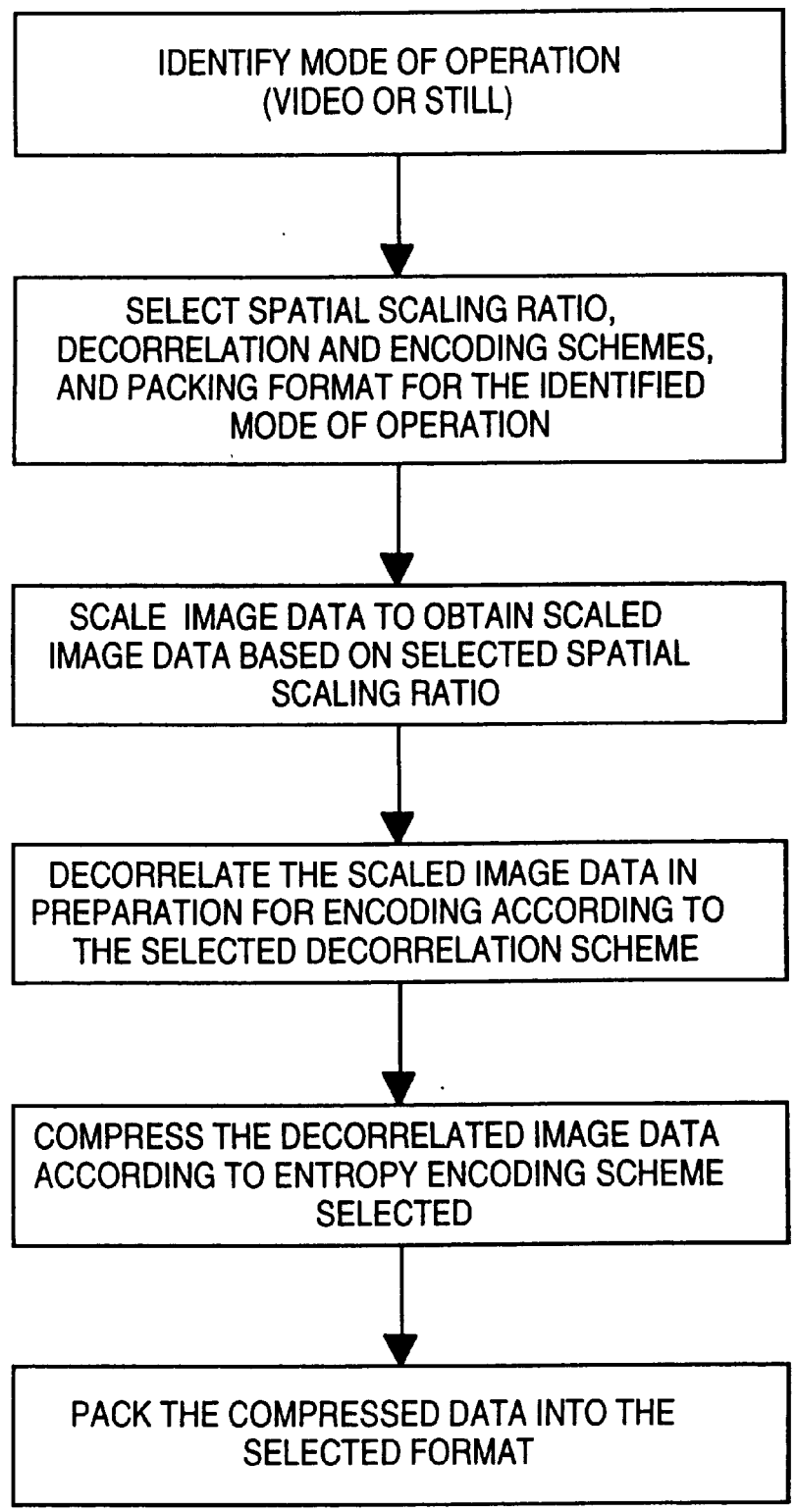
FIG. 3 is a logical flow diagram of signal processing steps performed according to another embodiment of the invention.

Although the current preferred embodiment of the video and still block 110 is as logic circuitry, the image processing system 200 may also be equipped with a programmed high performance processor executing instructions to perform the digital imaging functions of the block 110. Exemplary steps that may be performed by such a processor are illustrated in FIG. 3, and can be easily understood based on the description above of the correction block 210 and the compression logic 212 in the video and still processing block 110 embodiment in FIG. 2. The sequence of steps in FIG. 3 may be performed by the system controller 160, or by a separate, dedicated processor (not shown) that is also coupled to the bus 242.

To summarize, the above described embodiments of the invention may be used in an apparatus such as a portable digital camera that operates in both still mode (for capturing still images as a portable camera) and in video mode (where the digital camera is tethered via a computer peripheral bus interface to a host computer or other image viewing system). The camera has an image sensor and a video and still processing block 110 that is configured to capture detailed images in still mode, in both outdoor and indoor scenes. In video mode, the camera may be configured to compress a sequence of the detailed images (if needed for transmission and storage) using the same processing block 110 in order to capture a video sequence that can be transmitted to the host computer for viewing via a computer peripheral bus interface.

The embodiments of the invention described above are, of course, subject to some variations in structure and implementation. For instance, although the image data path in the processing block 110 is shown as being 8 bits wide initially and up to 16 bits when compressed, one skilled in the art will recognize that the invention can be implemented using other data path widths. Also, the system controller 160 may be combined with the data flow controller 238 into one physical, integrated circuit unit such as a microcontroller. Therefore, the scope of the invention should be determined not by the embodiments illustrated but by the appended claims and their legal equivalents.

What is claimed is:

1. An image processing system comprising:

signal processing circuitry for transforming received image sensor signals into digital image data, the processing circuitry including scaling logic for spatially scaling image data related to the sensor signals into scaled image data, decorrelation logic for decorrelating the scaled image data into decorrelated image data, and entropy encoding logic for compressing the decorrelated image data into variable size compressed image data, the system being configurable to operate in one of a plurality of modes, a first mode for providing video image data in which the decorrelation logic is configured to decorrelate according to a first decorrelation methodology suitable for generating video image data, the scaling logic is configured to scale according to a first scaling methodology suitable for generating video image data, and the encoding logic is configured to compress according to a first encoding methodology suitable for generating video image data, and a second mode for providing still image data in which the decorrelation logic is configured to decorrelate according to a second decorrelation methodology suitable for generating still image data, the encoding logic is configured to compress according to a second encoding methodology suitable for generating still image data, and the scaling logic is configured to scale according to a second scaling methodology suitable for generating still image data.

2. An image processing system as in claim 1 further comprising an encoding look-up table (LUT) for providing information to the encoding logic, as specified by the first encoding methodology.

3. An image processing system as in claim 2 further comprising:
   a computer bus, the encoding LUT being coupled to the computer bus; and
   a controller unit coupled to the computer bus, the controller unit being configured to load the encoding LUT with the information specified by the first encoding methodology in response to executing a plurality of instructions.

4. An image processing system as in claim 1 wherein the digital image data is of a compressed, variable size type, and further comprising a data packing unit for packing the digital image data into packed image data having a predefined and constant size.

5. The image processing system of claim 1 further comprising:
   communication interface to a computer peripheral bus, the interface being coupled to the signal processing circuitry for transferring the video image data outside the system.

6. The image processing system of claim 5 wherein the signal processing circuitry can be configured to operate in one of the plurality of modes in response to receiving commands from outside of the imaging system and receive via the communication interface.

7. The image processing system of claim 1 further comprising:
   removable storage device coupled to the signal processing circuitry to receive and store the still image data.

8. An apparatus for capturing digital images, comprising:
   optical interface for being exposed to incident light reflected from an object whose image is to be captured;
   image sensor coupled to the optical interface and generating sensor signals in response to the incident light;
   digital signal and image processing (DSIP) means for generating compressed image data in response to receiving the sensor signals, the DSIP means having compression logic for compressing received image data into variable size compressed image data, and
   data packing unit for packing the variable size compressed image data into constant size packed image data,
   the DSIP means being configurable to operate in one of a plurality of modes, a first mode for providing the packed image data as video image data in accordance with a first set of compression methodologies, and a second mode for providing the packed image data as still image data in accordance with a second set of compression methodologies;
   local storage means for receiving and storing the still image data; and
   communication interface configured to transfer the video image data to an electronic image viewing system separate from said apparatus.

9. An apparatus as in claim 8 wherein in the first mode the apparatus is further configured to transfer the still image data in the format of a disk file via the communication interface.

10. An apparatus as in claim 9 further comprising:
    a strobe for generating supplemental light to further illuminate the object when said apparatus is operating in the first mode.

11. An apparatus as in claim 8 wherein the local storage means comprises a removable memory.

12. An apparatus as in claim 8 wherein the communication interface is configured to transfer the packed image data according to a serial bus standard.

13. An apparatus as in claim 8 wherein the optical interface comprises a lens system having a fixed effective focal length.

* * * * *